(No Model.)

L. HERMAN.
CHAIN.

No. 490,409. Patented Jan. 24, 1893.

ATTEST
R. B. Moser
A. J. Symes

INVENTOR
Ludwig Herman
By H. T. Fisher
ATTORNEY

UNITED STATES PATENT OFFICE.

LUDWIG HERMAN, OF CLEVELAND, OHIO.

CHAIN.

SPECIFICATION forming part of Letters Patent No. 490,409, dated January 24, 1893.

Application filed February 11, 1892. Serial No. 421,201. (No model.)

*To all whom it may concern:*

Be it known that I, LUDWIG HERMAN, a citizen of the United States, residing at Cleveland, in the county of Cuyahoga and State of Ohio, have invented certain new and useful Improvements in Chains; and I do hereby declare that the following is a full, clear, and exact description of the invention, which will enable others skilled in the art to which it appertains to make and use the same.

This invention relates to certain new and useful improvements in chains, the invention having for its object the construction of a chain adapted for use in hoisting, hauling loads, transmitting power, as chain cable and all such other uses and purposes wherein the flexibility of the chain at all its joints is an essential feature.

To this end, my invention consists in constructing the link of four separable parts adapted to be assembled together to form a complete link, all as more fully hereinafter described and specifically pointed out in the claims.

The links of chains as ordinarily made, are formed from round iron bent to an elliptical shape, their ends being scarfed and welded together. It is a well known fact that chains thus made are often defective at the weld, either on account of imperfect welding or on account of the iron being over heated and burned until it loses much of its strength. Again, the strain in the sides of a link are tensile, and require a tough tenacious metal that will stand appreciable elongation without rupture, qualities found in soft iron and mild steel. The round ends of the links are subjected to transverse and shearing strains as well as abrasion by the action of the links upon each other and in passing over sheaves and drums. Hence, for this end part of the link the material should be harder than the other so as to endure the wear and strain that come upon it.

By the peculiar construction of my link, the end pieces are beams fixed at both ends and loaded in the middle. The strain in such an element of construction is definite and easy to determine. The same applies to the strains in my side pieces which are strictly tensile throughout their entire length. It is also a well known fact that, in the chains as ordinarily constructed, a very large percentage of the breakage occurs at the quarters, which is convincing proof that it is at the ends of the links where lie the weakest points whether at weld quarter, butt quarter or both, and it is the especial object of this present invention to overcome this and other well known objections in chains.

Figure 1:
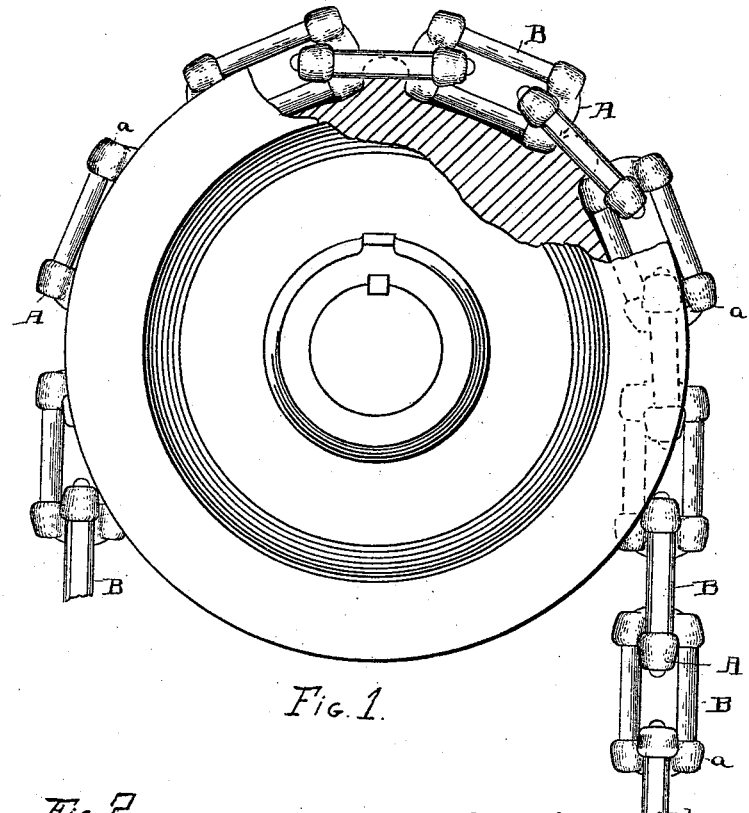
Figure 2:
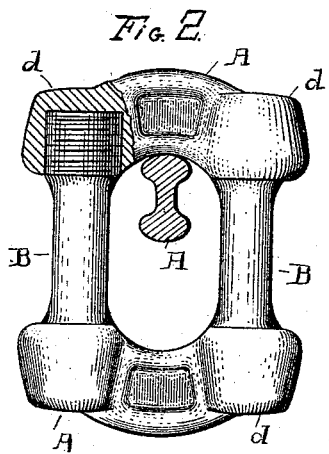
Figure 4:
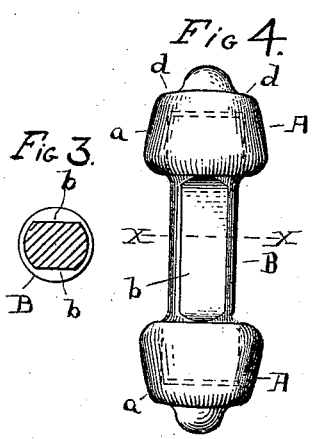
Figure 3:
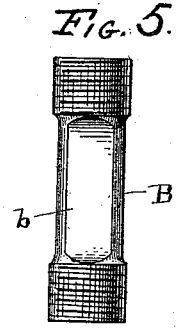
Figure 5:
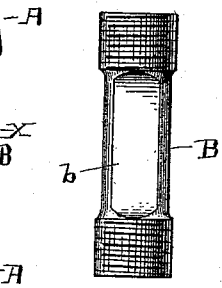

In the accompanying drawings Figure 1 is a side elevation of a sprocket wheel partly broken away at the top to disclose the relation of the teeth to the chain, and showing a section of chain upon said wheel. Fig. 2 is a side elevation of one of my improved links, having a portion of the upper yoke broken away to show the threaded side bar therein, and showing a cross section of a connecting yoke or link in its upper portion. Fig. 3 is a cross section of a side bar on line $x$—$x$ in Fig. 4. Fig. 4 is an edge view of my improved link. Fig. 5 is a side elevation in detail of one of the side bars.

As each link of my improved chain is constructed or built up of duplicate parts, a description of one link is deemed sufficient. The ends of the links consist of yokes A, substantially of the form shown; the ends of the links terminate in enlarged heads forming shoulders $a$, and these heads are interiorly threaded at right angles to the length of the yokes to receive the ends of the side pieces, as hereinafter described. These yokes may be cast in any suitable metal or alloy, or may be forged in suitable molds by pressure, or by means of drop forging, and of such strength and hardness as shall best adapt them to the service they may be specially designed for. The preferred form of cross section at the point where the yokes cross, when assembled in the chain, is shown in Fig. 2, but this form may be varied without departing from the spirit of my invention. By making the yokes substantially of the form shown at their ends, the chain built up will be effectually prevented from becoming entangled and the employment of the "studs" does not become necessary. The enlargements at the ends of the yokes not only give strength to such yokes where the side pieces enter, but they serve to form a bearing for the link when it is used on a drum or sheave, thus preventing the bending of the link, and this is clearly illustrated in Fig. 1, where the shoulders at each end of the link rest on the sheave, the center or side pieces of the link being free.

Should the chain be used on a sprocket wheel, the sprockets would come in contact with the spherical or convex surface $d$, and this would spread the contact with the sprocket over a considerable surface thus diminishing the wear at that point. The surface $d$ may be hardened if desired.

B represents the side bars of the link, and are shown as having flat sides $b$, but, while this is a preferred form for these bars, I do not desire to be limited to any shape thereof in cross section. It will be observed that the side pieces are reduced in cross section between their ends, while their threaded ends are enlarged. This construction makes the intermediate portion of the side pieces the point of greatest weakness, and enables the artisan to calculate with the utmost exactness just what the strength of a given size of chain will be. It will also be observed that there is practically no limit to the size of chain that may be constructed on this principle, and the sizes may run from one-fourth inch or less to several inches, in the cross section of the side bars, the yokes in all cases being of proportionate strength. The threads on the ends of the side bars are cut right and left so that they may be screwed into the ends of the yokes when turned in one direction. This construction admits of ready adjustment of the pitch should any link become elongated through continued use or the replacing of a side bar or yoke should one become defective, and every facility is provided for splicing, lengthening or shortening the chain at any point within the length of the chain.

Another advantage in my construction is, that by the cross section shown in the yoke or end piece, the radius of the bearing surface is considerably larger than in a link made of round iron of equal weight, hence, this bearing surface being thus enlarged, the abrasion of the links upon each other is materially reduced.

The construction of my link is such that each part, as well as the entire chain, can be made by automatic machinery especially designed for the purpose, and which will be subject to other applications for patent.

What I claim as my invention is—

1. A link for a chain constructed of four separable pieces comprising two end pieces or yokes, having enlarged ends interiorly threaded, and two side pieces whose ends are enlarged in cross section, said enlarged ends being threaded and adapted to engage with the ends of the yokes or end pieces, substantially as and for the purposes set forth.

2. A link for a chain constructed of four separable pieces comprising two end pieces or yokes having enlarged ends interiorly threaded and provided with the shoulders $a$ and bearing faces $d$, in combination with two side pieces whose enlarged ends are threaded and adapted to engage with the ends of the end pieces, substantially in the manner and for the purposes set forth.

Witness my hand to the foregoing specification this 1st day of February, 1892.

LUDWIG HERMAN.

Witnesses:
 H. S. FISHER,
 NELLIE L. McLANE.